(12) United States Patent
Wang et al.

(10) Patent No.: US 9,589,063 B2
(45) Date of Patent: Mar. 7, 2017

(54) TWO-DIMENSIONAL CODE PROCESSING METHOD AND TERMINAL

(71) Applicant: Huawei Device Co., Ltd., Shenzhen (CN)

(72) Inventors: Chan Wang, Shenzhen (CN); Huangwei Wu, Shenzhen (CN); Wenmei Gao, Beijing (CN); Dian Fu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/805,634

(22) Filed: Jul. 22, 2015

(65) Prior Publication Data

US 2015/0324477 A1 Nov. 12, 2015

Related U.S. Application Data

(63) Continuation of application No. PCT/CN2014/076530, filed on Apr. 29, 2014.

(51) Int. Cl.
*G06F 17/30* (2006.01)
*G06K 7/14* (2006.01)

(52) U.S. Cl.
CPC ..... *G06F 17/30879* (2013.01); *G06K 7/1417* (2013.01)

(58) Field of Classification Search
CPC ... G06F 17/30879; G06K 7/1417; G06K 5/00
See application file for complete search history.

(56) References Cited

U.S. PATENT DOCUMENTS

| 8,668,144 B2 * | 3/2014 | Evevsky | G06F 21/31 |
| | | | 235/380 |
| 2005/0011958 A1 | 1/2005 | Fukasawa et al. | |

(Continued)

FOREIGN PATENT DOCUMENTS

| CN | 102055775 A | 5/2011 |
| CN | 102609742 A | 7/2012 |

(Continued)

OTHER PUBLICATIONS

Partial English Translation and Abstract of Chinese Patent Application No. CN102917023, Oct. 24, 2015, 5 pages.

(Continued)

*Primary Examiner* — Sonji Johnson
(74) *Attorney, Agent, or Firm* — Conley Rose, P.C.

(57) ABSTRACT

Embodiments disclosed herein relate to the field of computer technologies, and disclose a two-dimensional code processing method and a terminal, which can reduce time for a user to learn content indicated by a two-dimensional code, thereby improving a user experience effect. The method provided by the embodiments of the present invention includes: scanning a two-dimensional code using a camera to obtain two-dimensional code information; sending a first request message including the two-dimensional code information to a server, where the first request message is used to enable the server to determine description information corresponding to the two-dimensional code information; receiving the description information sent by the server; and outputting the description information, so that the user determines, according to the description information, whether to acquire detailed information corresponding to the two-dimensional code information.

17 Claims, 7 Drawing Sheets

(56) References Cited

U.S. PATENT DOCUMENTS

| | | | |
|---|---|---|---|
| 2012/0181330 A1* | 7/2012 | Kim | G06Q 30/02 235/375 |
| 2013/0124959 A1 | 5/2013 | Miyahara et al. | |
| 2014/0258334 A1* | 9/2014 | Mukasa | G06F 21/6218 707/781 |

FOREIGN PATENT DOCUMENTS

| | | |
|---|---|---|
| CN | 102692881 A | 9/2012 |
| CN | 102831377 A | 12/2012 |
| CN | 102917023 A | 2/2013 |
| CN | 103092600 A | 5/2013 |
| CN | 103310329 A | 9/2013 |
| CN | 103473828 A | 12/2013 |
| EP | 2575058 A1 | 4/2013 |

OTHER PUBLICATIONS

Partial English Translation and Abstract of Chinese Patent Application No. CN102831377, Jul. 15, 2015, 3 pages.

Partial English Translation and Abstract of Chinese Patent Application No. CN103473828, Jul. 15, 2015, 3 pages.

Foreign Communication From A Counterpart Application, PCT Application No. PCT/CN2014/076530, International Search Report dated Jan. 28, 2015, 7 pages.

Foreign Communication From A Counterpart Application, PCT Application No. PCT/CN2014/076530, Written Opinion dated Jan. 28, 2015, 4 pages.

Foreign Communication From A Counterpart Application, European Application No. 14878391.3, Extended European Search Report dated Feb. 2, 2016, 9 pages.

Foreign Communication From A Counterpart Application, Chinese Application No. 201480001851.6, Chinese Office Action dated Aug. 1, 2016, 7 pages.

"WAG UAProf," Wireless Application Protocol, WAP-248-UAPROF-20011020-a, Version 20, Oct. 2001, 86 pages.

Foreign Communication From A Counterpart Application, European Application No. 14878391.3, Extended European Office Action dated Sep. 2, 2016, 8 pages.

* cited by examiner

TWO-DIMENSIONAL CODE PROCESSING METHOD AND TERMINAL

CROSS-REFERENCE TO RELATED APPLICATION

This application is a continuation of International Application No. PCT/CN2014/076530, filed on Apr. 29, 2014, which is incorporated herein by reference in its entirety.

TECHNICAL FIELD

The present invention relates to the field of computer technologies, and in particular, to a two-dimensional code processing method and a terminal.

BACKGROUND

A two-dimensional code indicates data information using black and white patterns distributed on a plane. In a solution of the prior art, a user can learn content indicated by a two-dimensional code only after the user learns detailed information corresponding to two-dimensional code information, where the detailed information corresponding to the two-dimensional code information refers to web page content corresponding to a website address indicated by the two-dimensional code. It takes a relatively long time for a terminal to obtain the detailed information corresponding to the two-dimensional code information, and the detailed information may be not content that the user is interested in. In this case, after waiting for a long time, the user obtains content that the user is not interested in, which results in a bad user experience effect.

SUMMARY

Embodiments of the present invention provide a two-dimensional code processing method and a terminal, which can reduce time for a user to learn content indicated by a two-dimensional code, thereby improving a user experience effect.

According to a first aspect, a two-dimensional code processing method is provided, where the method is applied to a terminal, the terminal includes a camera, and the method includes scanning a two-dimensional code using the camera to obtain two-dimensional code information; sending a first request message including the two-dimensional code information to a server, where the first request message is used to enable the server to determine description information corresponding to the two-dimensional code information; receiving the description information sent by the server; and outputting the description information, so that a user determines, according to the description information, whether to acquire detailed information corresponding to the two-dimensional code information.

With reference to the first aspect, in a first possible implementation manner, the outputting the description information, so that a user determines, according to the description information, whether to acquire detailed information corresponding to the two-dimensional code information includes determining a second display area according to a first display area used to display the two-dimensional code, where the second display area is smaller than or equal to the first display area; and displaying the description information in the second display area.

With reference to the first aspect or the first possible implementation manner of the first aspect, in a second possible implementation manner, the first request message further includes file attribute information; the first request message is used to enable the server to determine description information that is corresponding to the two-dimensional code information and that matches the file attribute information.

With reference to the second possible implementation manner of the first aspect, in a third possible implementation manner, before the sending a first request message including the two-dimensional code information to a server, the method further includes acquiring file attribute information indicated by the user; or acquiring, according to attribute information of the terminal and the two-dimensional code information, file attribute information that matches the terminal.

With reference to the first aspect or the first possible implementation manner of the first aspect, in a fourth possible implementation manner, the first request message further includes attribute information of the terminal; the first request message is used to enable the server to determine description information that is corresponding to the two-dimensional code information and that matches the attribute information of the terminal.

With reference to the first aspect, in a fifth possible implementation manner, the two-dimensional code information includes a first uniform resource identifier (URI) of the description information corresponding to the two-dimensional code information; the first request message is used to enable the server to determine the description information according to the first URI; or the two-dimensional code information includes a second URI of the detailed information corresponding to the two-dimensional code information; the first request message is used to enable the server to determine, according to the second URI, a first URI of the description information corresponding to the two-dimensional code information, and determine the description information according to the first URI.

With reference to the first aspect, in a sixth possible implementation manner, the two-dimensional code information includes a second URI of the detailed information corresponding to the two-dimensional code information; after the outputting the description information, so that a user determines, according to the description information, whether to acquire detailed information corresponding to the two-dimensional code information, the method further includes acquiring an input operation indicated by the user; sending a second request message to the server according to the input operation, where the second request message includes the second URI, and the second request message is used to enable the server to determine, according to the second URI, the detailed information corresponding to the two-dimensional code information; receiving the detailed information sent by the server; and outputting the detailed information.

According to a second aspect, a terminal is provided, including a scanning unit configured to scan a two-dimensional code to obtain two-dimensional code information; a sending unit configured to send a first request message including the two-dimensional code information to a server, where the first request message is used to enable the server to determine description information corresponding to the two-dimensional code information; a receiving unit configured to receive the description information sent by the server; and an output unit configured to output the description information, so that a user determines, according to the description information, whether to acquire detailed information corresponding to the two-dimensional code information.

With reference to the second aspect, in a first possible implementation manner, the output unit is configured to determine a second display area according to a first display area used to display the two-dimensional code, where the second display area is smaller than or equal to the first display area; and display the description information in the second display area.

With reference to the second aspect or the first possible implementation manner of the second aspect, in a second possible implementation manner, the first request message further includes file attribute information; the first request message is used to enable the server to determine description information that is corresponding to the two-dimensional code information and that matches the file attribute information.

With reference to the second possible implementation manner of the second aspect, in a third possible implementation manner, the terminal further includes an acquiring unit configured to acquire file attribute information indicated by the user; or acquire, according to attribute information of the terminal and the two-dimensional code information, file attribute information that matches the terminal.

With reference to the second aspect or the first possible implementation manner of the second aspect, in a fourth possible implementation manner, the first request message further includes attribute information of the terminal; the first request message is used to enable the server to determine description information that is corresponding to the two-dimensional code information and that matches the attribute information of the terminal.

With reference to the first aspect, in a fifth possible implementation manner, the two-dimensional code information includes a first uniform resource identifier URI of the description information corresponding to the two-dimensional code information; the first request message is used to enable the server to determine the description information according to the first URI; or the two-dimensional code information includes a second URI of the detailed information corresponding to the two-dimensional code information; the first request message is used to enable the server to determine, according to the second URI, a first URI of the description information corresponding to the two-dimensional code information, and determine the description information according to the first URI.

With reference to the second aspect, in a sixth possible implementation manner, the two-dimensional code information includes a second URI of the detailed information corresponding to the two-dimensional code information; the terminal further includes an acquiring unit configured to acquire an input operation indicated by the user, where the sending unit is further configured to send a second request message to the server according to the input operation, where the second request message includes the second URI, and the second request message is used to enable the server to determine, according to the second URI, the detailed information corresponding to the two-dimensional code information; the receiving unit is further configured to receive the detailed information sent by the server; and the output unit is further configured to output the detailed information.

According to a third aspect, a terminal is provided, including a camera configured to scan a two-dimensional code to obtain two-dimensional code information; a sender configured to send a first request message including the two-dimensional code information to a server, where the first request message is used to enable the server to determine description information corresponding to the two-dimensional code information; a receiver configured to receive the description information sent by the server; and a processor configured to output the description information, so that a user determines, according to the description information, whether to acquire detailed information corresponding to the two-dimensional code information.

With reference to the third aspect, in a first possible implementation manner, the processor is configured to determine a second display area according to a first display area used to display the two-dimensional code, where the second display area is smaller than or equal to the first display area; and display the description information in the second display area.

With reference to the third aspect or the first possible implementation manner of the third aspect, in a second possible implementation manner, the first request message further includes file attribute information; the first request message is used to enable the server to determine description information that is corresponding to the two-dimensional code information and that matches the file attribute information.

With reference to the second possible implementation manner of the third aspect, in a third possible implementation manner, the processor is further configured to acquire file attribute information indicated by the user; or acquire, according to attribute information of the terminal and the two-dimensional code information, file attribute information that matches the terminal.

With reference to the third aspect or the first possible implementation manner of the third aspect, in a fourth possible implementation manner, the first request message further includes attribute information of the terminal; the first request message is used to enable the server to determine description information that is corresponding to the two-dimensional code information and that matches the attribute information of the terminal.

With reference to the third aspect, in a fifth possible implementation manner, the two-dimensional code information includes a first uniform resource identifier URI of the description information corresponding to the two-dimensional code information; the first request message is used to enable the server to determine the description information according to the first URI; or the two-dimensional code information includes a second URI of the detailed information corresponding to the two-dimensional code information; the first request message is used to enable the server to determine, according to the second URI, a first URI of the description information corresponding to the two-dimensional code information, and determine the description information according to the first URI.

With reference to the third aspect, in a sixth possible implementation manner, the two-dimensional code information includes a second URI of the detailed information corresponding to the two-dimensional code information; the processor is further configured to acquire an input operation indicated by the user; the sender is further configured to send a second request message to the server according to the input operation, where the second request message includes the second URI, and the second request message is used to enable the server to determine, according to the second URI, the detailed information corresponding to the two-dimensional code information; the receiver is further configured to receive the detailed information sent by the server; and the processor is further configured to output the detailed information.

In this solution, a terminal scans a two-dimensional code using a camera to obtain two-dimensional code information, requests description information corresponding to the two-dimensional code information from a server, and outputs the description information, so that a user can learn content indicated by the two-dimensional code. Compared with the prior art, this solution can reduce time for the user to learn the content indicated by the two-dimensional code, thereby improving a usage effect for the user. In addition, the user can determine, according to the description information, whether the content indicated by the two-dimensional code is content that the user is interested in.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by persons of ordinary skill in the art based on the embodiments of the present invention without creative efforts shall fall within the protection scope of the present invention.

It should be noted that the character "/" in this specification generally indicates an "or" relationship between the associated objects.

Embodiment One

Figure 1:
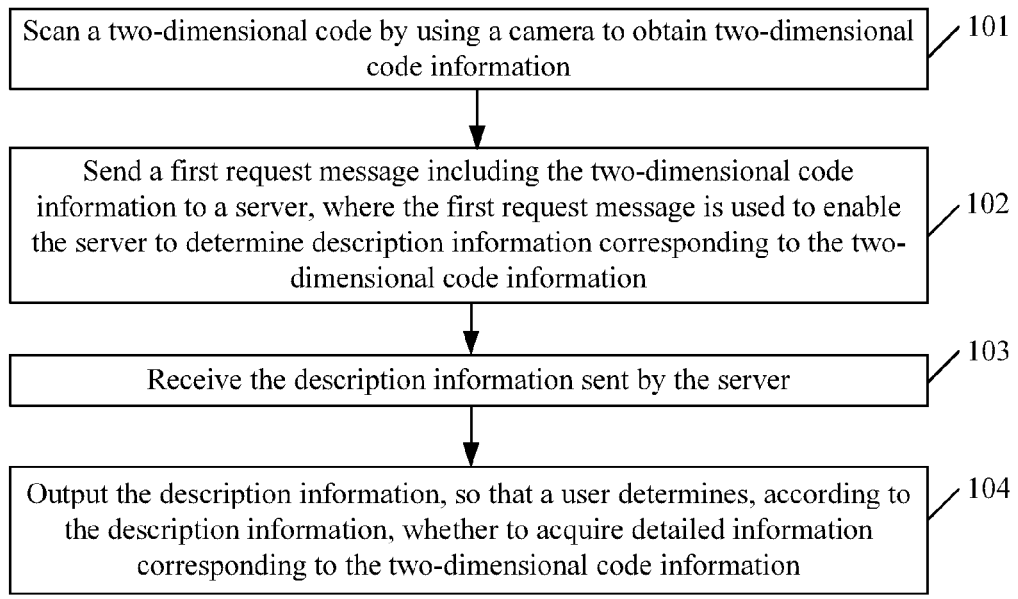
FIG. 1 is a schematic flowchart of a two-dimensional code processing method according to an embodiment of the present invention.

FIG. 1 shows a two-dimensional code processing method provided by an embodiment of the present invention, where the method is applied to a terminal, and the terminal includes a camera. The method includes:

101. Scan a two-dimensional code using the camera to obtain two-dimensional code information.

The "terminal" may include but is not limited to the following devices: a mobile phone, a mobile computer, a tablet computer, a personal digital assistant (PDA), a media player, a smart television, a smart watch, smart glasses, a smart band, a camera, and the like.

The terminal includes two-dimensional code recognition software. Step 101 includes the terminal scanning the two-dimensional code based on the two-dimensional code recognition software and using the camera to obtain the two-dimensional code information.

102. Send a first request message including the two-dimensional code information to a server, where the first request message is used to enable the server to determine description information corresponding to the two-dimensional code information.

In an embodiment of the present invention, the two-dimensional code information includes a first URI of the description information corresponding to the two-dimensional code information; the first request message is used to enable the server to determine the description information according to the first URI. Exemplarily, in this case, the two-dimensional code information may include a URI (that is, a "second URI" described below) of detailed information corresponding to the two-dimensional code information and the URI (that is, the "first URI") of the description information corresponding to the two-dimensional code information.

In another embodiment of the present invention, the two-dimensional code information includes a second URI of detailed information corresponding to the two-dimensional code information; the first request message is used to enable the server to determine, according to the second URI, a first URI of the description information corresponding to the two-dimensional code information, and determine the description information according to the first URI. Exemplarily, in this case, the two-dimensional code information may include the URI (that is, the "second URI") of the detailed information corresponding to the two-dimensional code information.

The "description information corresponding to the two-dimensional code information" refers to information that can describe content indicated by the two-dimensional code and that is simpler than the detailed information corresponding to the two-dimensional code information. The description information corresponding to the two-dimensional code information may be a keyword, a digest, a related field, an applicable scenario, or the like, of the detailed information corresponding to the two-dimensional code information. The detailed information corresponding to the two-dimensional code information may correspond to one or more pieces of description information, and in specific implementation, a type of the description information (including a keyword, a digest, a related field, an applicable scenario, and the like) may be specified by a user, or may be determined by the terminal according to an attribute of the terminal.

It should be noted that, the terminal may scan the two-dimensional code using the camera to directly obtain the second URI, and determine the first URI according to the second URI; or may scan the two-dimensional code using the camera to directly obtain the first URI and the second URI.

Optionally, the first request message further includes file attribute information; the first request message is used to enable the server to determine description information that is corresponding to the two-dimensional code information and that matches the file attribute information. Exemplarily, this embodiment of the present invention does not limit a specific implementation manner of acquiring the file attribute information by the terminal. For example, the file attribute information is specified by the user, or file attribute information that matches the terminal is acquired according to attribute information of the terminal and the two-dimensional code information.

Optionally, the first request message further includes attribute information of the terminal; the first request message is used to enable the server to determine description information that is corresponding to the two-dimensional code information and that matches the attribute information of the terminal.

103. Receive the description information sent by the server.

104. Output the description information, so that a user determines, according to the description information, whether to acquire detailed information corresponding to the two-dimensional code information.

Exemplarily, step 104 may include outputting the description information according to a file type (which includes but is not limited to a video, audio, an image, text, and the like) of the description information.

To facilitate the user to perform an operation on the two-dimensional code obtained by scanning, in an embodiment of the present invention, the two-dimensional code and the description information may be displayed on a same display interface. Step 104 may include determining a second display area according to a first display area used to display the two-dimensional code, where the second display area is smaller than or equal to the first display area; and displaying the description information in the second display area.

Optionally, the two-dimensional code information includes a second URI of the detailed information corresponding to the two-dimensional code information; after step 104, the method may further include acquiring an input operation indicated by the user; sending a second request message to the server according to the input operation, where the second request message includes the second URI, and the second request message is used to enable the server to determine, according to the second URI, the detailed information corresponding to the two-dimensional code information; receiving the detailed information sent by the server; and outputting the detailed information.

According to the two-dimensional code processing method provided by this embodiment of the present invention, a terminal scans a two-dimensional code using a camera to obtain two-dimensional code information, requests description information corresponding to the two-dimensional code information from a server, and outputs the description information, so that a user can learn content indicated by the two-dimensional code. Compared with the prior art, this solution can reduce time for the user to learn the content indicated by the two-dimensional code, thereby improving a usage effect for the user. In addition, the user can determine, according to the description information, whether the content indicated by the two-dimensional code is content that the user is interested in.

Embodiment 1

In Embodiment 1, two-dimensional code information includes a first URI of description information corresponding to the two-dimensional code information, and a second URI of detailed information corresponding to the two-dimensional code information.

Figure 2:
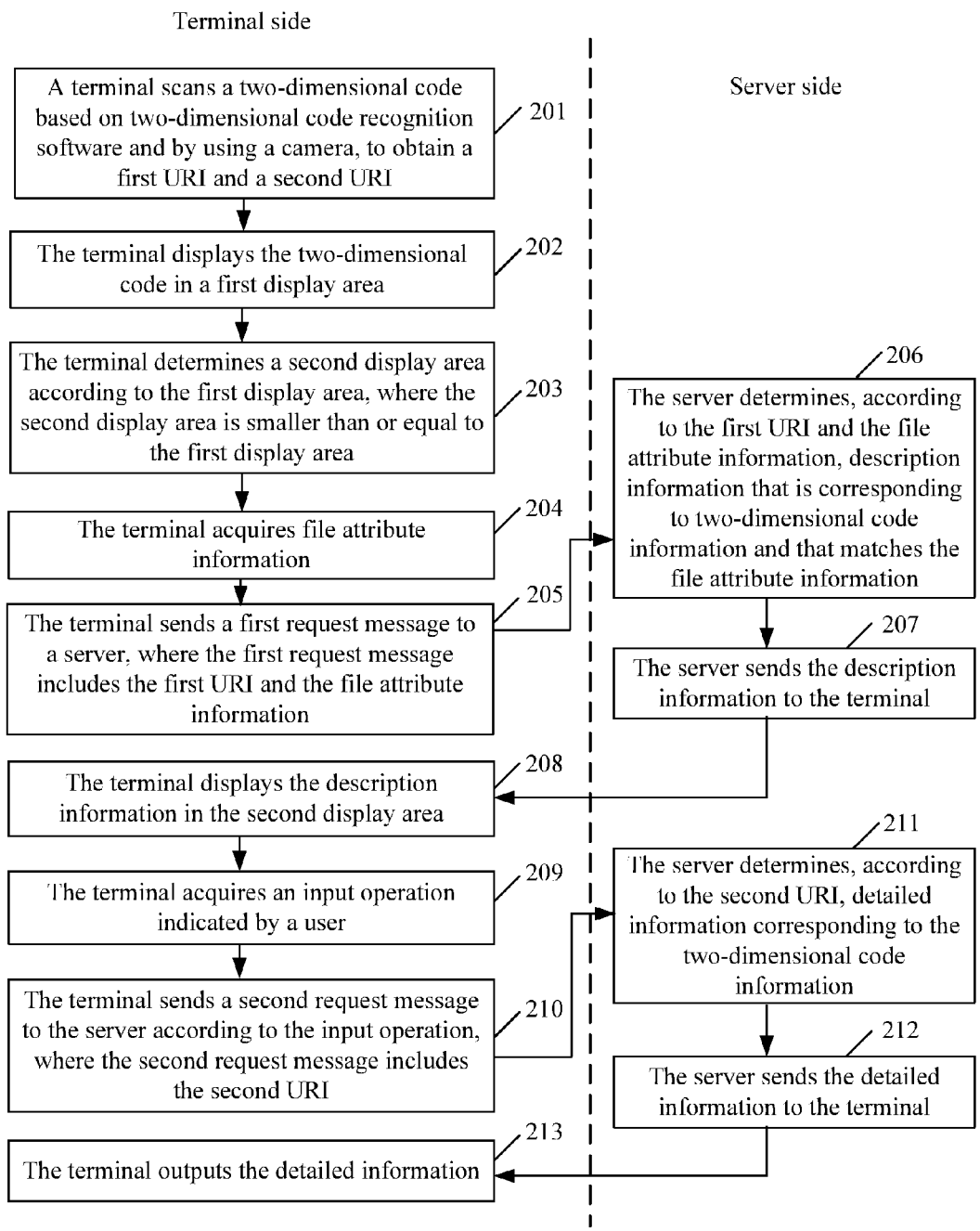
FIG. 2 is a schematic flowchart of a two-dimensional code processing method according to Embodiment 1 of the present invention.

FIG. 2 shows a two-dimensional code processing method provided by an embodiment of the present invention. The method includes:

201. A terminal scans a two-dimensional code based on two-dimensional code recognition software and using a camera, to obtain a first URI and a second URI.

It should be noted that, for related explanations of this embodiment, reference may be made to the foregoing Embodiment One.

202. The terminal displays the two-dimensional code in a first display area. It should be noted that, for a specific implementation manner of step 202, reference may be made to the prior art, and description is not provided herein.

203. The terminal determines a second display area according to the first display area, where the second display area is smaller than or equal to the first display area.

Exemplarily, this embodiment of the present invention does not limit a location relationship between the first display area and the second display area. For example, the second display area may be displayed around the first display area, or displayed by overlaying the first display area, or displayed in the first display area in a perspective manner.

It should be noted that, in implementation, steps 202 to 203 may be implemented in any one step prior to step 206.

204. The terminal acquires file attribute information. Exemplarily, step 204 may be implemented by the terminal acquiring file attribute information indicated by a user. In implementation, multiple types of file attribute information may be set in the terminal in advance, and the terminal outputs these types of file attribute information to the user for selection, so as to obtain the file attribute information indicated by the user; the terminal may further output a file attribute information edit box to the user, so as to obtain file attribute information edited by the user.

Step 204 may further be implemented by the terminal obtaining, according to attribute information of the terminal, file attribute information that matches the terminal. For example, when the terminal has a relatively small screen, the obtained file attribute information that matches the terminal is an audio file.

The "file attribute information" includes but is not limited to one or multiple types of the following information: a file type, a file format, a file size, and the like. The file type includes but is not limited to a video file, an audio file, a picture file, a text file, and the like. A picture file is used as an example to describe the file format. A file format of the picture file may include but is not limited to: graphics interchange format (GIF), joint photographic experts group (JPEG), and the like.

The "attribute information of the terminal" includes but is not limited to one or multiple types of the following information: a terminal type, a type of playback software installed in the terminal, geographical location information of the terminal, a screen size, screen resolution, an operating system, a hardware capability, an operating system version, a processor type, and the like. The terminal type includes but is not limited to a mobile phone, a mobile computer, a tablet computer, a PDA, a media player, a smart television, a smart watch, smart glasses, a smart band, a camera, and the like; the type of playback software installed in the terminal includes but is not limited to a video player, an audio player, and the like; the geographical location information of the terminal may be obtained, by measurement, by a global positioning system (GPS) installed in the terminal.

205. The terminal sends a first request message to a server, where the first request message includes the first URI and the file attribute information.

206. The server determines, according to the first URI and the file attribute information, description information that is corresponding to the two-dimensional code information and that matches the file attribute information. Exemplarily, when the file attribute information is a GIF file format, the description information determined by the server is a picture file that is related to the first URI and in a file format of GIF; when the file attribute information is a video file, the description information determined by the server is an video file related to the first URI.

207. The server sends the description information to the terminal.

208. The terminal displays the description information in the second display area. It should be noted that, in implementation, the user may determine, according to the description information displayed in the second display area, whether content indicated by the two-dimensional code is content that the user is interested in; if yes, the user indicates an input operation to the terminal; and if not, this procedure ends.

209. The terminal acquires an input operation indicated by a user. Exemplarily, the input operation indicated by the user may be, for example, the user clicking the first display area used to display the two-dimensional code.

210. The terminal sends a second request message to the server according to the input operation, where the second request message includes the second URI.

211. The server determines, according to the second URI, detailed information corresponding to the two-dimensional code information.

212. The server sends the detailed information to the terminal.

213. The terminal outputs the detailed information.

After step 213 is performed, this procedure ends.

It should be noted that, for an implementation manner of steps 209 to 213, reference may be made to the prior art, and description is not provided herein.

Figure 2A:
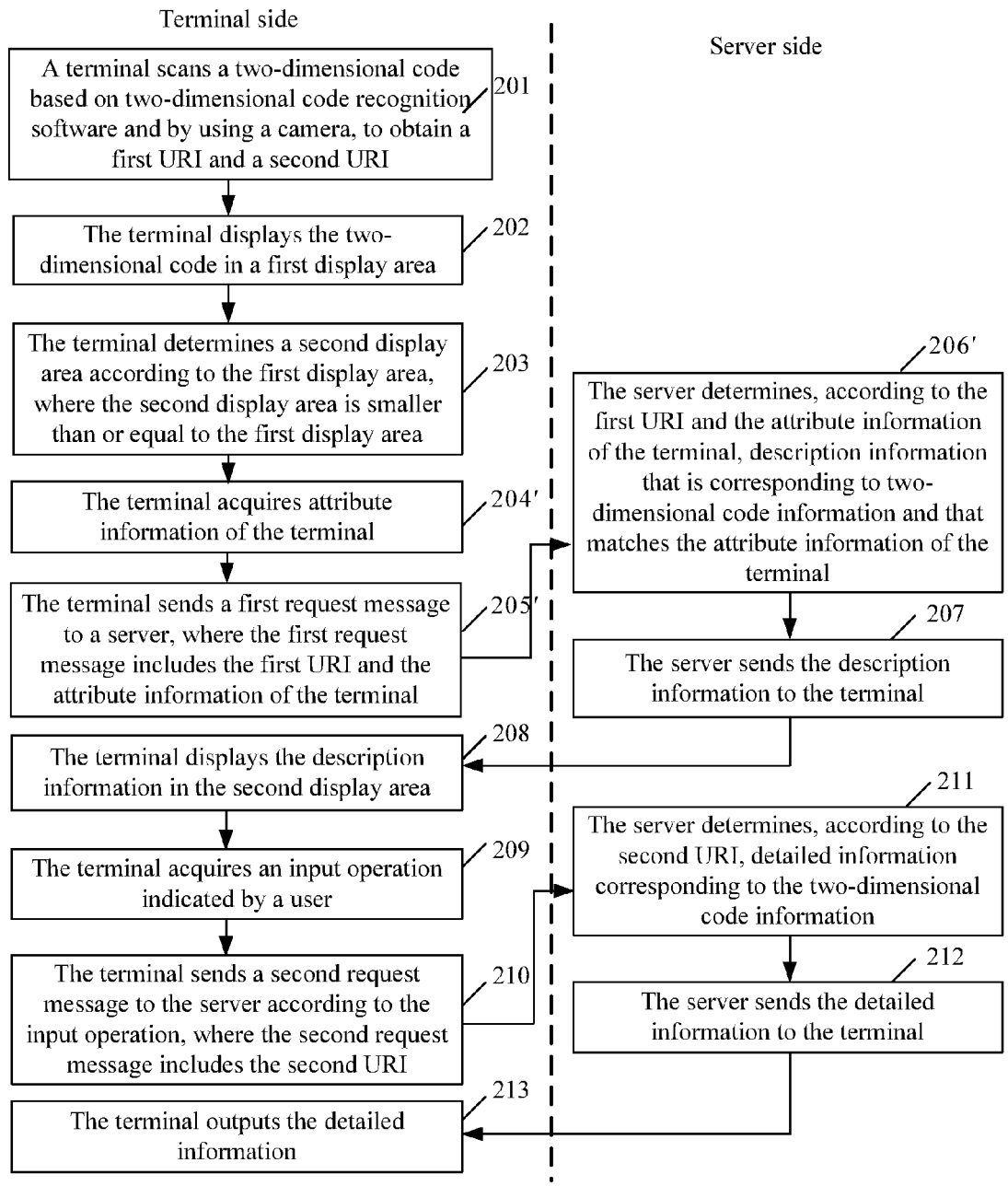
FIG. 2A is a schematic flowchart of another two-dimensional code processing method according to Embodiment 1 of the present invention.

Optionally, as shown in FIG. 2A, the foregoing steps 204 to 206 may be replaced with the following steps 204' to 206'.

204'. The terminal acquires attribute information of the terminal.

205'. The terminal sends a first request message to a server, where the first request message includes the first URI and the attribute information of the terminal.

206'. The server determines, according to the first URI and the attribute information of the terminal, description information that is corresponding to the two-dimensional code information and that matches the attribute information of the terminal.

Exemplarily, when the attribute information of the terminal is that a video file is supported, the description information determined by the server may be a video file; when the attribute information of the terminal is a screen size, the server may determine the description information according to a screen size of the terminal, for example, when the terminal has a relatively small screen, the description information may be voice information, and when the terminal has a relatively large screen, the description information may be text information or picture information.

According to the two-dimensional code processing method provided by this embodiment of the present invention, a terminal scans a two-dimensional code using a camera to obtain two-dimensional code information, requests description information corresponding to the two-dimensional code information from a server, and outputs the description information, so that a user can learn content indicated by the two-dimensional code. Compared with the prior art, this solution can reduce time for the user to learn the content indicated by the two-dimensional code, thereby improving a usage effect for the user. In addition, the user can determine, according to the description information, whether the content indicated by the two-dimensional code is content that the user is interested in.

Embodiment 2

In Embodiment 2, two-dimensional code information includes a second URI of detailed information corresponding to the two-dimensional code information.

Figure 3:
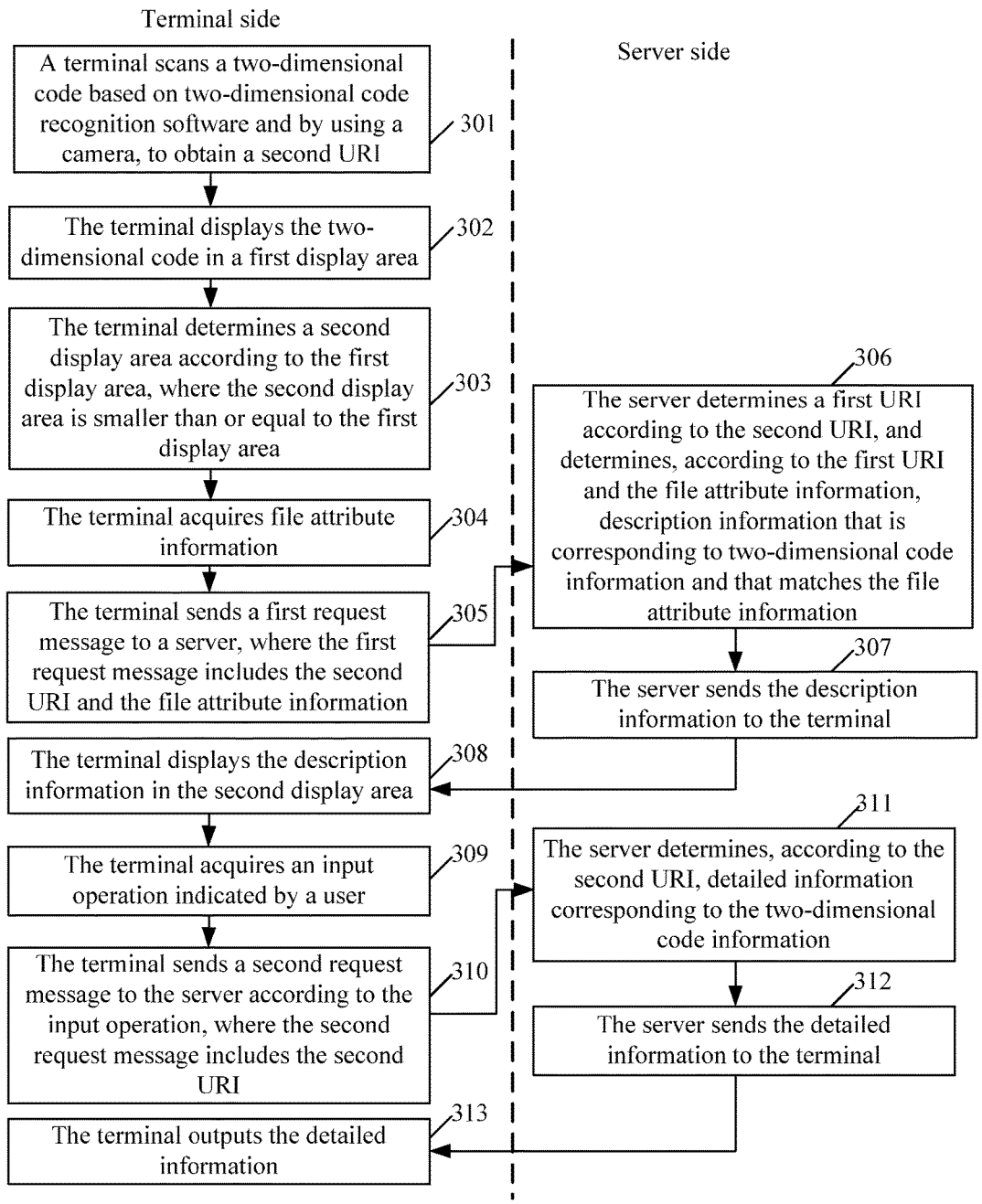
FIG. 3 is a schematic flowchart of a two-dimensional code processing method according to Embodiment 2 of the present invention.

FIG. 3 shows a two-dimensional code processing method provided by an embodiment of the present invention. The method includes:

301. A terminal scans a two-dimensional code based on two-dimensional code recognition software and using a camera, to obtain a second URI.

It should be noted that, for related explanations of this embodiment, reference may be made to the foregoing Embodiment One.

Steps 302 to 304 are the same as steps 202 to 204 in the foregoing Embodiment 1.

305. The terminal sends a first request message to a server, where the first request message includes the second URI and the file attribute information.

306. The server determines a first URI according to the second URI, and determines, according to the first URI and the file attribute information, description information that is corresponding to the two-dimensional code information and that matches the file attribute information.

Exemplarily, the server determining a first URI according to the second URI may be comprise the server parsing the second URI, and determining the first URI according to information obtained by parsing, such as a domain name and a keyword.

Steps 307 to 313 are the same as steps 207 to 213 in the foregoing Embodiment 1.

Figure 3A:
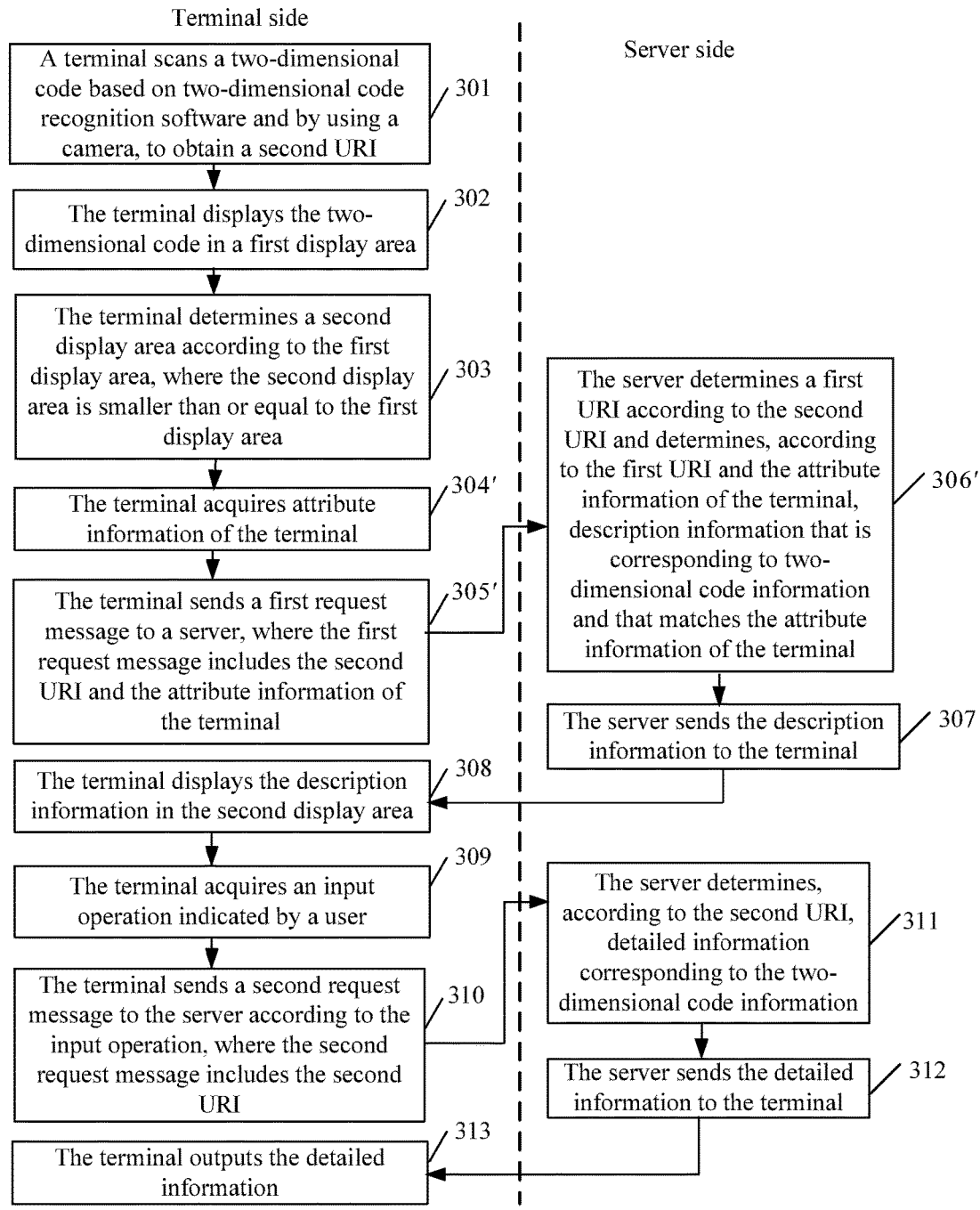
FIG. 3A is a schematic flowchart of another two-dimensional code processing method according to Embodiment 2 of the present invention.

Optionally, as shown in FIG. 3A, the foregoing steps 304 to 306 may be replaced with the following steps 304' to 306'.

304'. The terminal acquires attribute information of the terminal.

305'. The terminal sends a first request message to a server, where the first request message includes the second URI and the attribute information of the terminal.

306'. The server determines a first URI according to the second URI, and determines, according to the first URI and the attribute information of the terminal, description information that is corresponding to the two-dimensional code information and that matches the attribute information of the terminal.

According to the two-dimensional code processing method provided by this embodiment of the present invention, a terminal scans a two-dimensional code using a camera to obtain two-dimensional code information, requests description information corresponding to the two-dimensional code information from a server, and outputs the description information, so that a user can learn content indicated by the two-dimensional code. Compared with the prior art, this solution can reduce time for the user to learn the content indicated by the two-dimensional code, thereby improving a usage effect for the user. In addition, the user can determine, according to the description information, whether the content indicated by the two-dimensional code is content that the user is interested in.

Embodiment Two

Figure 4:
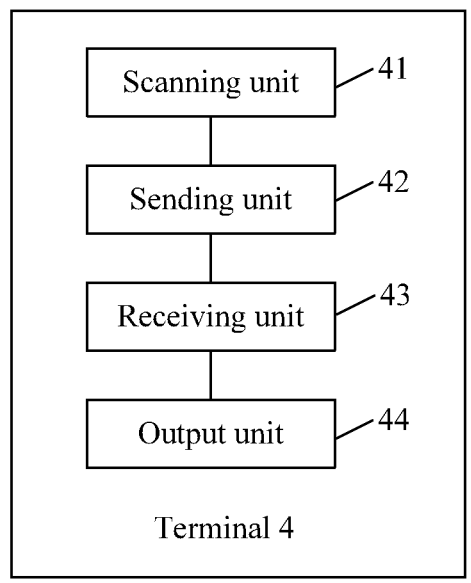
FIG. 4 is a schematic structural diagram of a terminal according to Embodiment Two of the present invention.

FIG. 4 shows a terminal 4 provided by this embodiment, where the terminal 4 is configured to execute the two-dimensional code processing method shown in FIG. 1. The terminal 4 includes a scanning unit 41 configured to scan a two-dimensional code to obtain two-dimensional code information; a sending unit 42 configured to send a first request message including the two-dimensional code information to a server, where the first request message is used to enable the server to determine description information corresponding to the two-dimensional code information; a receiving unit 43 configured to receive the description information sent by the server; and an output unit 44 configured to output the description information, so that a user determines, according to the description information, whether to acquire detailed information corresponding to the two-dimensional code information.

Optionally, the output unit 44 is configured to determine a second display area according to a first display area used to display the two-dimensional code, where the second display area is smaller than or equal to the first display area; and display the description information in the second display area.

Optionally, the first request message further includes file attribute information; and the first request message is used to enable the server to determine description information that is corresponding to the two-dimensional code information and that matches the file attribute information.

Figure 5:
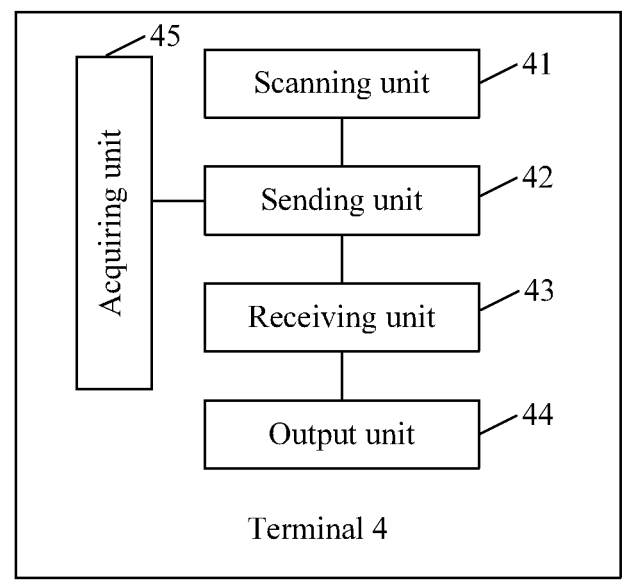
FIG. 5 is a schematic structural diagram of another terminal according to Embodiment Two of the present invention.

Optionally, as shown in FIG. 5, the terminal 4 further includes an acquiring unit 45 configured to acquire file attribute information indicated by the user; or acquire, according to attribute information of the terminal and the two-dimensional code information, file attribute information that matches the terminal.

Optionally, the first request message further includes attribute information of the terminal; the first request message is used to enable the server to determine description information that is corresponding to the two-dimensional code information and that matches the attribute information of the terminal.

Optionally, the two-dimensional code information includes a first uniform resource identifier URI that is used to enable the server to determine the description information according to the first URI; or the two-dimensional code information includes a second URI of the detailed information corresponding to the two-dimensional code information, and the method further includes determining a first URI according to the second URI, where the first URI is used to enable the server to determine the description information according to the first URI.

Optionally, the two-dimensional code information includes a second URI of the detailed information corresponding to the two-dimensional code information. As shown in FIG. 5, the terminal 4 further includes an acquiring unit 45 configured to acquire an input operation indicated by the user, where the sending unit 42 is further configured to send a second request message to the server according to the input operation, where the second request message includes the second URI, and the second request message is used to enable the server to determine, according to the second URI, detailed information corresponding to the two-dimensional code information; the receiving unit 43 is further configured to receive the detailed information sent by the server; and the output unit 44 is further configured to output the detailed information.

The terminal provided by this embodiment of the present invention scans a two-dimensional code using a camera to obtain two-dimensional code information, requests description information corresponding to the two-dimensional code information from a server, and outputs the description information, so that a user learns content indicated by the two-dimensional code. Compared with the prior art, this solution can reduce time for the user to learn the content indicated by the two-dimensional code, thereby improving a usage effect for the user. In addition, the user can determine, according to the description information, whether the content indicated by the two-dimensional code is content that the user is interested in.

Embodiment Three

Figure 6:
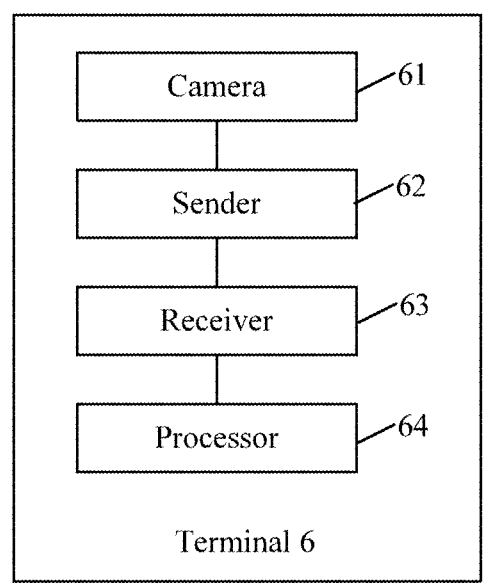
FIG. 6 is a schematic structural diagram of a terminal according to Embodiment Three of the present invention.

FIG. 6 shows a terminal 6 provided by this embodiment, where the terminal 6 is configured to execute the two-dimensional code processing method shown in FIG. 1. The terminal 6 includes a camera 61 configured to scan a two-dimensional code to obtain two-dimensional code information; a sender 62 configured to send a first request message including the two-dimensional code information to a server, where the first request message is used to enable the server to determine description information corresponding to the two-dimensional code information; a receiver 63 configured to receive the description information sent by the server; and a processor 64 configured to output the description information, so that a user determines, according to the description information, whether to acquire detailed information corresponding to the two-dimensional code information.

Optionally, the processor 64 is configured to determine a second display area according to a first display area used to display the two-dimensional code, where the second display area is smaller than or equal to the first display area; and display the description information in the second display area.

Optionally, the first request message further includes file attribute information; the first request message is used to enable the server to determine description information that is corresponding to the two-dimensional code information and that matches the file attribute information.

Optionally, the processor 64 is further configured to acquire file attribute information indicated by the user; or acquire, according to attribute information of the terminal and the two-dimensional code information, file attribute information that matches the terminal.

Optionally, the first request message further includes attribute information of the terminal; the first request message is used to enable the server to determine description information that is corresponding to the two-dimensional code information and that matches the attribute information of the terminal.

Optionally, the two-dimensional code information includes a first uniform resource identifier URI of the description information corresponding to the two-dimensional code information; the first request message is used to enable the server to determine the description information according to the first URI; or the two-dimensional code information includes a second URI of the detailed information corresponding to the two-dimensional code information; the first request message is used to enable the server to determine, according to the second URI, a first URI of the description information corresponding to the two-dimensional code information, and determine the description information according to the first URI.

Optionally, the two-dimensional code information includes a second URI of the detailed information corresponding to the two-dimensional code information; the processor 64 is further configured to acquire an input operation indicated by the user; the sender 62 is further configured to send a second request message to the server according to the input operation, where the second request message includes the second URI, and the second request message is used to enable the server to determine, according to the second URI, the detailed information corresponding to the two-dimensional code information; the receiver 63 is further configured to receive the detailed information sent by the server; and the processor 64 is further configured to output the detailed information.

The terminal provided by this embodiment of the present invention scans a two-dimensional code using a camera to obtain two-dimensional code information, requests description information corresponding to the two-dimensional code information from a server, and outputs the description information, so that a user learns content indicated by the two-dimensional code. Compared with the prior art, this solution can reduce time for the user to learn the content indicated by the two-dimensional code, thereby improving a usage effect for the user. In addition, the user can determine, according to the description information, whether the content indicated by the two-dimensional code is content that the user is interested in.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A two-dimensional code processing method, wherein the method is applied to a terminal having a camera, the method comprising:
    scanning a two-dimensional code using the camera to obtain two-dimensional code information, wherein the two-dimensional code information comprises a first uniform resource identifier (URI) of description information corresponding to the two-dimensional code information, and a second URI of detailed information corresponding to the two-dimensional code information;
    sending a first request message comprising the two-dimensional code information to a server, wherein the first request message comprises the first URI, and wherein the first request message enables the server to determine, according to the first URI, the description information corresponding to the two-dimensional code information;
    receiving the description information sent by the server, and
    outputting the description information, so that a user determines, according to the description information, whether to acquire the detailed information corresponding to the two-dimensional code information;
    acquiring an input operation indicated by the user;
    sending a second request message to the server according to the input operation, wherein the second request message comprises the second URI, and wherein the second request message enables the server to determine, according to the second URI, the detailed information corresponding to the two-dimensional code information;
    receiving the detailed information sent by the server; and
    outputting the detailed information.

2. The method according to claim 1, wherein outputting the description information comprises:
    determining a second display area according to a first display area used to display the two-dimensional code information, wherein the second display area is smaller than or equal to the first display area; and
    displaying the description information in the second display area.

3. The method according to claim 1, wherein the first request message further comprises file attribute information, and wherein the first request message enables the server to determine description information that corresponds to the two-dimensional code information and matches the file attribute information.

4. The method according to claim 3, wherein, before the sending the first request message comprising the two-dimensional code information to the server, the method further comprises acquiring file attribute information indicated by the user.

5. The method according to claim 3, wherein, before the sending the first request message comprising the two-dimensional code information to the server, the method further comprises acquiring, according to attribute information of the terminal and the two-dimensional code information, file attribute information that matches the terminal.

6. The method according to claim 1, wherein the first request message further comprises attribute information of the terminal, and wherein the first request message enables the server to determine description information that corresponds to the two-dimensional code information and matches the attribute information of the terminal.

7. The method according to claim 1, wherein the first request message enables the server to determine, according to the second URI, the first URI of the description information corresponding to the two-dimensional code information.

8. The method according to claim 1, wherein the first URI is different than the second URI.

9. The method according to claim 1, wherein the camera is used to scan the two-dimensional code to obtain the first URI and the second URI.

10. The method according to claim 1, wherein the camera is used to scan the two-dimensional code to obtain the second URI, and wherein the first URI is determined from the second URI.

11. A terminal comprising:
a camera configured to scan a two-dimensional code to obtain two-dimensional code information, wherein the two-dimensional code information comprises a first uniform resource identifier (URI) of description information corresponding to the two-dimensional code information, and a second URI of detailed information corresponding to the two-dimensional code information;
a transmitter configured to send a first request message comprising the two-dimensional code information to a server, wherein the first request message enables the server to determine the description information corresponding to the two-dimensional code information;
a receiver configured to receive the description information sent by the server; and
a processor configured to output the description information, so that a user determines, according to the description information, whether to acquire the detailed information corresponding to the two-dimensional code information;
wherein the processor is further configured to acquire an input operation indicated by the user,
wherein the transmitter is further configured to send a second request message to the server according to the input operation, wherein the second request message comprises the second URI, and the second request message enables the server to determine, according to the second URI, the detailed information corresponding to the two-dimensional code information,
wherein the receiver is further configured to receive the detailed information sent by the server, and
wherein the processor is further configured to output the detailed information.

12. The terminal according to claim 11, wherein the processor is further configured to:
determine a second display area according to a first display area used to display the two-dimensional code, wherein the second display area is smaller than or equal to the first display area; and
display the description information in the second display area.

13. The terminal according to claim 11, wherein the first request message further comprises file attribute information, and wherein the first request message enables the server to determine description information that corresponds to the two-dimensional code information and matches the file attribute information.

14. The terminal according to claim 13, wherein the processor is further configured to acquire file attribute information indicated by the user.

15. The terminal according to claim 13, wherein the processer is further configured to acquire, according to attribute information of the terminal and the two-dimensional code information, file attribute information that matches the terminal.

16. The terminal according to claim 11, wherein the first request message further comprises attribute information of the terminal, and wherein the first request message enables the server to determine description information that corresponds to the two-dimensional code information and matches the attribute information of the terminal.

17. The terminal according to claim 11, wherein the first request message enables the server to determine, according to the second URI, the first URI of the description information corresponding to the two-dimensional code information, and determine the description information according to the first URI.

* * * * *